(12) United States Patent
Chu et al.

(10) Patent No.: US 11,150,153 B2
(45) Date of Patent: Oct. 19, 2021

(54) TORQUE SENSING AND TRANSMITTING DEVICE

(71) Applicant: CHINA PNEUMATIC CORPORATION, Taoyuan (TW)

(72) Inventors: Hsiu-Feng Chu, Taoyuan (TW); Yu-Te Chu, Taoyuan (TW)

(73) Assignee: China Pneumatic Corporation, Taoyuan (TW)

( * ) Notice: Subject to any disclaimer, the term of this patent is extended or adjusted under 35 U.S.C. 154(b) by 223 days.

(21) Appl. No.: 16/427,098

(22) Filed: May 30, 2019

(65) Prior Publication Data

US 2020/0225106 A1 Jul. 16, 2020

(30) Foreign Application Priority Data

Jan. 10, 2019 (TW) ................................. 108100946

(51) Int. Cl.
| | |
|---|---|
| *G01L 5/24* | (2006.01) |
| *F16F 15/139* | (2006.01) |
| *F16F 15/131* | (2006.01) |
| *B25B 23/142* | (2006.01) |

(52) U.S. Cl.
CPC ............ *G01L 5/24* (2013.01); *B25B 23/1425* (2013.01); *F16F 15/139* (2013.01); *F16F 15/13142* (2013.01)

(58) Field of Classification Search
CPC ..... G01L 5/24; F16F 15/13142; F16F 15/139; B25B 23/1425
See application file for complete search history.

(56) References Cited

U.S. PATENT DOCUMENTS

| | | | |
|---|---|---|---|
| 7,095,198 B1 * | 8/2006 | O'Brien | ................... G01L 3/242 318/432 |
| 7,779,704 B1 | 8/2010 | Chu | |
| 10,933,605 B2 * | 3/2021 | Shen | ......................... B64C 1/40 |
| 2004/0226622 A1 * | 11/2004 | Hayashi | ................... F16L 27/11 138/121 |

(Continued)

FOREIGN PATENT DOCUMENTS

| | | |
|---|---|---|
| DE | 10217416 C1 | 7/2003 |
| JP | S57-168034 U | 10/1982 |

(Continued)

*Primary Examiner* — Max H Noori
*Assistant Examiner* — Masoud H Noori
(74) *Attorney, Agent, or Firm* — Wang Law Firm, Inc.

(57) ABSTRACT

A torque-sensing and transmitting device is provided. The device includes a transmission body, two vibration-damping members, two inner casings, two outer casings, a first circuit board module, and a battery module. The two inner casings are disposed on a shaft of the transmission body, and a vibration-damping member is disposed between the inner casing and the shaft. The first circuit board module is disposed in one of the two inner casings, and the first circuit board module is covered by a vibration-damping layer. The battery module is disposed on the other inner casing, and the battery module is covered by a vibration-damping layer. With the configuration of the vibration-damping member and the vibration-damping layer, this device solves the problem of the first circuit board module and the battery module being damaged due to vibration.

18 Claims, 7 Drawing Sheets

(56) References Cited

U.S. PATENT DOCUMENTS

| | | | |
|---|---|---|---|
| 2006/0037410 A1* | 2/2006 | Gierut | G01L 3/101 |
| | | | 73/862.335 |
| 2010/0192705 A1* | 8/2010 | Chu | B25B 23/14 |
| | | | 73/862.338 |
| 2011/0094316 A1 | 4/2011 | Hsieh | |
| 2014/0096985 A1* | 4/2014 | Chu | B25B 23/1405 |
| | | | 173/1 |
| 2015/0040665 A1 | 2/2015 | Borkholder et al. | |
| 2018/0012047 A1* | 1/2018 | Chu | F16B 1/0071 |
| 2020/0055174 A1* | 2/2020 | Matei | A47L 5/24 |

FOREIGN PATENT DOCUMENTS

| | | |
|---|---|---|
| JP | H08-015059 A | 1/1996 |
| JP | H08193896 A | 7/1996 |
| JP | 2004-233296 A | 8/2008 |
| JP | 3165435 U | 1/2011 |
| JP | 2013-015459 A | 1/2013 |
| TW | M378815 U | 4/2010 |
| TW | 201511897 A | 4/2015 |
| TW | I631323 B | 8/2018 |

\* cited by examiner

TORQUE SENSING AND TRANSMITTING DEVICE

CROSS-REFERENCE TO RELATED APPLICATION

This application claims priority from Taiwan Patent Application No. 108100946, filed on Jan. 10, 2019, in the Taiwan Intellectual Property Office, the content of which is hereby incorporated by reference in its entirety for all purposes.

BACKGROUND OF THE INVENTION

1. Field of the Invention

The present invention relates to a torque-sensing and transmitting device.

2. Description of the Related Art

Torque-sensing and transmitting devices nowadays have typically only been applied to torque-tightening tools operated manually or tools with low vibration during operation. U.S. Pat. No. 7,779,704 granted for the present inventor describes an anti-vibration torque sensing and control device for tools which include: an anti-vibration torque sensor fabricated with rib structure for various types of pneumatic, electric, or manual tightening tools. Prior art utilizes an elastic material to cover and secure all related electronic elements of the torque-sensing output system attached to the rib structure by means of an adhesive or by filling. This technique prevents electronic elements from being damaged, which may cause elements of the tools to detach from each other due to vibration during operation. The anti-vibration device is made of a vibration-proof material and does not obstruct or weaken the output torque signal.

However, in practice, covering and fixing all related electronic elements attached to the rib structure by means of adhesive or filling may lead to the internal damaged elements not being able to be fixed due to the elastic material already being interposed between the tiny gaps among the electronic elements. This would cause highly expensive costs for maintenance.

Furthermore, since the torque-sensing output system is directly attached and fixed on the rib structure, vibration occurs in the tightening process. Vibrations are still directly transmitted to all the related electronic elements of the torque-sensing output system, which may result in damage of the electronic elements.

Accordingly, the inventor of the present invention has designed a torque-sensing and transmitting device with a vibration-damping structure in an effort to tackle with deficiencies in the prior art and further to enhance the implementation and application in industries.

SUMMARY OF THE INVENTION

According to the purpose, the present invention provides a torque-sensing and transmitting device with vibration-damping structure, including a transmission body, a torque-sensing module, two vibration-damping members, a first inner casing, a second inner casing, a first circuit board module, and a battery module. The middle section of the transmission body is concaved to form a shaft, and two ends of the shaft respectively have an input portion and an output portion. The torque-sensing module is disposed on the shaft to sense torque. The vibration-damping members are made of an elastic material and are in a ladder shape and a non-cylindrical shape, and the axis thereof has a non-circular penetration portion; each of the vibration-damping members is disposed at the two ends of the shaft via the penetration portion to respectively attach the input portion and the output portion. A face of the first inner casing is concaved to have a first capacity groove, and another face thereof opposite to the first capacity groove has a first attaching portion; two ends of the first attaching portion are respectively attached to each of the vibration-damping members and indirectly make flexible contact with the transmission body. A face of the second inner casing has a second attaching portion, and two ends of the second attaching portion are respectively attached to each of the vibration-damping members and indirectly make flexible contact with the transmission body. The first circuit board module is disposed in the first capacity groove and electrically connected to the torque-sensing module. The battery module is disposed in the second inner casing and electrically connected to the first circuit board module.

According to the purpose, the present invention further provides a torque-sensing and transmitting device which further includes a first vibration-damping layer and a second vibration-damping layer instead of having the aforementioned vibration-damping member disposed therein. The first vibration-damping layer is made of an elastic material to cover an outside of the first circuit board module in such a way that the first circuit board module is elastically clamped between the first inner casing and the first outer casing. The second vibration-damping layer is made of an elastic material to cover an outside of the battery module in such a way that the battery module is elastically clamped between the second inner casing and the second outer casing.

According to the purpose, the present invention further provides a torque-sensing and transmitting device, wherein the aforementioned vibration-damping member, the first vibration-damping layer, and the second vibration-damping layer are simultaneously provided.

Preferably, the first vibration-damping layer and the second vibration-damping layer are made of an elastic material that does not block signal transmission and is used to make the first circuit board module and the battery module respectively an elastic module via a cast molding method.

Preferably, the first vibration-damping layer and the second vibration-damping layer may also be made of an individually-formed material via a sandwich covering method instead of the manufacturing process via the cast molding method. The vibration-damping effect may still be maintained.

Preferably, when the battery module is disposed in the second inner casing, another face of the second inner casing opposite to the second attaching portion is concaved to have a second capacity groove, and the battery module is disposed in the second capacity groove.

Preferably, the two ends of the shaft are in a non-circular shape, and the penetration portion, the first attaching portion, and the second attaching portion are in a non-circular shape corresponding to the two ends of the shaft to prevent the inner and outer casings from rotating around the shaft after assembly.

Preferably, the torque-sensing and transmitting device is a torque sensor, the input portion is detachably connected to an output axis of a torque tool, and the output portion is detachably connected to an impact socket.

Preferably, the torque-sensing and transmitting device is a torque-sensing and transmitting socket, the input portion is detachably connected to an output axis of a torque tool, and the output portion is detachably connected to an element to be tightened.

Preferably, the first circuit board module includes an input-output unit which is a universal serial bus to supply an output or input signal or input power.

Preferably, the torque-sensing and transmitting device is disposed in a torque tool or externally connected to an output end of the torque tool.

The embodiments of the torque sensor of the present invention are to be described below with reference to the related drawings. For ease of understanding, the same elements in the following embodiments are to be described in accordance with the same symbols.

DESCRIPTION OF THE PREFERRED EMBODIMENTS

To facilitate the review of the technical features, contents, advantages, and achievable effects of the present invention, the embodiments together with the attached drawings are described below in detail. However, the drawings are used for the purpose of indicating and supporting the specification, which may not depict the real proportion of elements and precise configuration in the implementation of the present invention. Therefore, the depicted proportion and configuration of the attached drawings should not be interpreted to limit the scope of implementation of the present invention.

The torque-sensing and transmitting device of the present invention may be applied to a torque sensor, an impact socket having a torque-sensing function, or a torque tool, which are to be described as follows.

Figure 1:
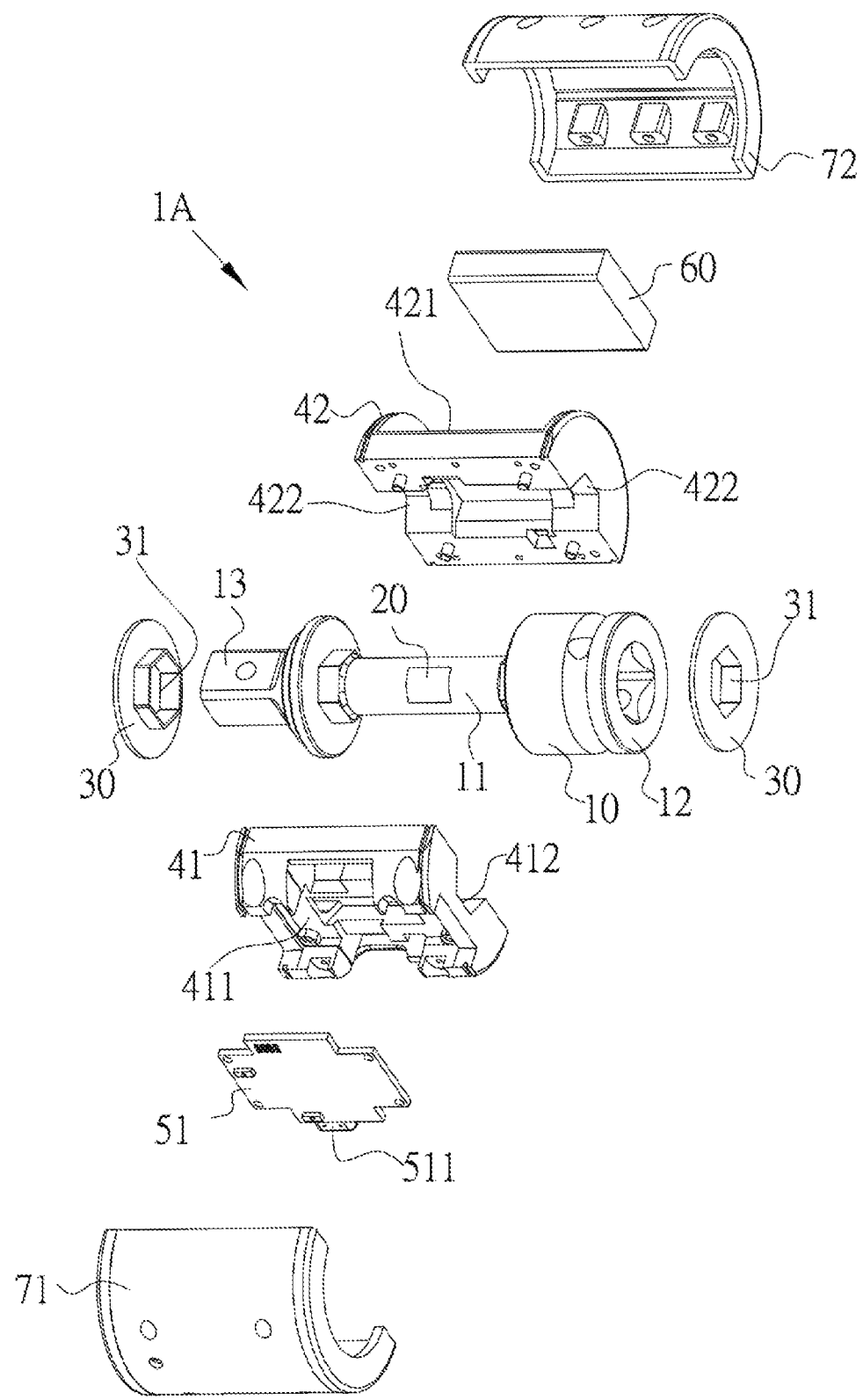
FIG. 1 depicts an explosion diagram of the torque-sensing and transmitting device according to the first embodiment of the present invention.
Figure 2:
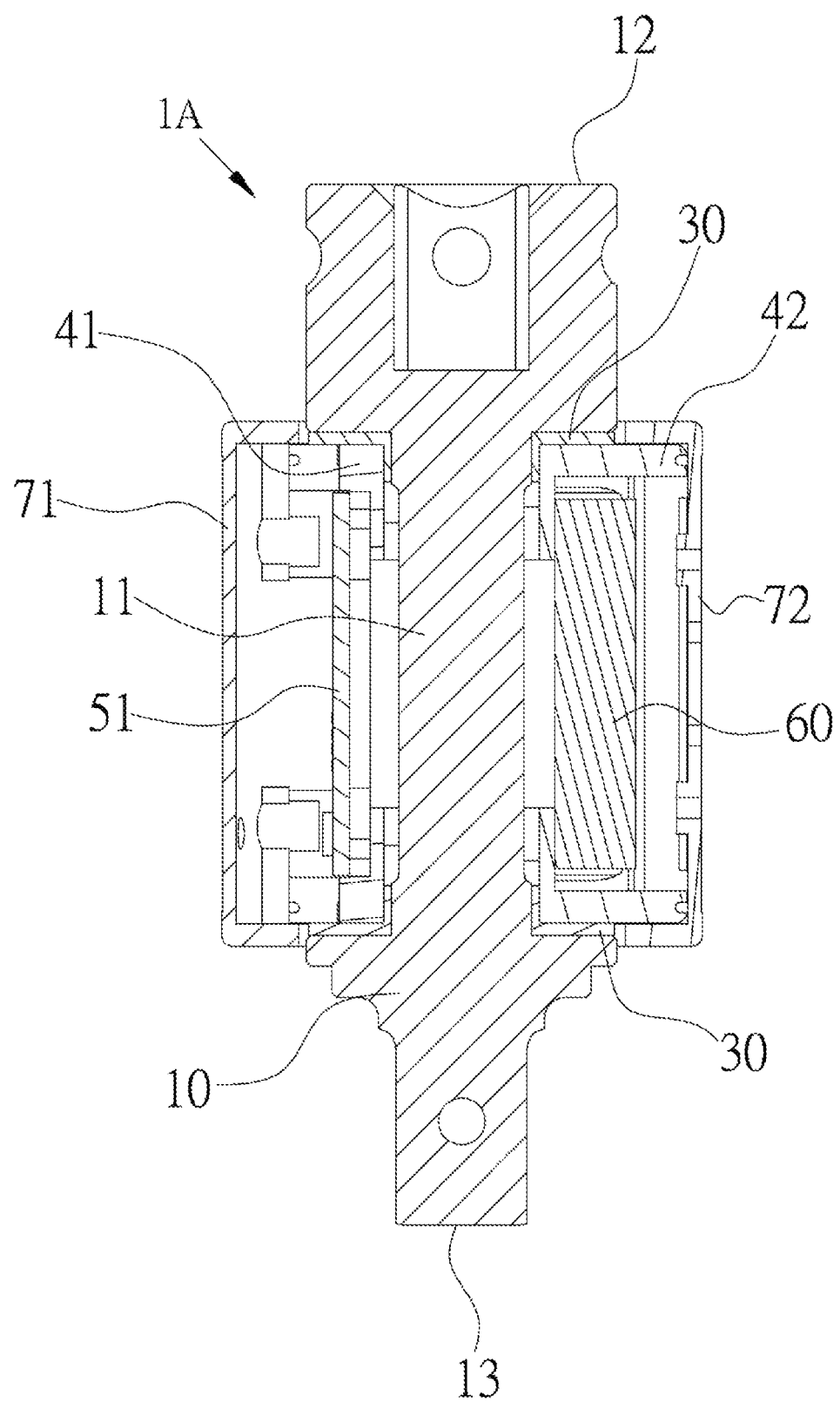
FIG. 2 depicts an assembly diagram of the torque-sensing and transmitting device according to the first embodiment of the present invention.

Please refer to FIG. 1 and FIG. 2. In the present embodiment, the torque-sensing and transmitting device of the present invention may be a torque sensor.

As shown, the torque-sensing and transmitting device 1A of the present invention includes a transmission body 10, a torque-sensing module 20, two vibration-damping members 30, a first inner casing 41, a second inner casing 42, a first circuit board module 51, a battery module 60, a first outer casing 71, and a second outer casing 72. The middle section of the transmission body 10 is concaved to form a shaft 11, and the two ends of the shaft 11 respectively have an input portion 12 and an output portion 13. Wherein, the input portion 12 is used to connect the output axis of the torque tool, and the output portion 13 is used to connect the sleeve, for instance, tightening the elements, such as bolts or nuts.

The torque-sensing module 20 is disposed on the shaft 11. The torque-sensing module 20 is preferably a strain gauge that is directly attached to the shaft 11. During a tightening operation, the shaft 11 may be slightly deformed due to the applied torque. The torque-sensing module 20 generates a corresponding signal according to the deformation, and the first circuit board module 51 may convert the signal into a corresponding torque value.

Each of the vibration-damping members 30 is made of an elastic material, such as rubber, in a ladder shape and a non-cylindrical shape, and the axis thereof has a penetration portion 31. Each of the vibration-damping members 30 is disposed at the two ends of the shaft 11 via the penetration portion 31 to respectively attach the input portion 12 and the output portion 13. A face of the first inner casing 41 is concaved to have a first capacity groove 411, and another face thereof opposite to the first capacity groove 411 has a first attaching portion 412. Two ends of the first attaching portion 412 are respectively attached to each of the vibration-damping members 30, which allows the first inner casing 41 to indirectly make flexible contact with the transmission body 10. A face of the second inner casing 42 is concaved to have a second capacity groove 421, and another face thereof opposite to the second capacity groove 421 has a second attaching portion 422. Two ends of the second attaching portion 422 are respectively attached to each of the vibration-damping members 30, which allows the second inner casing 42 to indirectly make flexible contact with the transmission body 10. That is, when assembled, the first inner casing 41 and the second inner casing 42 do not make direct contact with the transmission body 10.

Wherein, the two ends of the shaft 11 are in a non-circular shape, and the penetration portion 31, the first attaching portion 412, and the second attaching portion 422 are in a shape corresponding to the two ends of the shaft in order to prevent the inner and outer casings from rotating around the shaft 11 after assembly.

The first circuit board module 51 is disposed in the first capacity groove 411 and electrically connected to the torque-sensing module 20. The battery module 60 is disposed in the second capacity groove 421, and the battery module 60 is electrically connected to the first circuit board module 51 in order to supply required electric power to the torque-sensing and transmitting device 1A when in operation.

The first outer casing 71 and the second outer casing 72 may be respectively and detachably covered on the outside of the first inner casing 41 and the second inner casing 42. Wherein, the first outer casing 71 and the second outer casing 72 are assembled and fixed to each other in such a way that the elements inside the first outer casing 71 and the second outer casing 72 can be firmly fixed to the shaft 11. In a preferred embodiment, the first inner casing 41 and the second inner casing 42 are also assembled and fixed to each other, and the vibration-damping member 30 is elastically pressed and fixed to the shaft 11 via the attaching portion 412. The aforementioned method that describes elements assembled and fixed to each other may be a tightening or buckling method.

The torque-sensing and transmitting device 1A of the present invention allows the first inner casing 41 and the second inner casing 42 to make indirect contact with transmission body 10 by the aforementioned structural configuration. Moreover, the problem of the first circuit board module 51 and the battery module 60 being damaged due to vibration may be effectively solved via using the vibration-damping member 30 which reduces the vibration transmitted from the transmission body 10 to the first inner casing 41 and the second inner casing 42.

Figure 3:
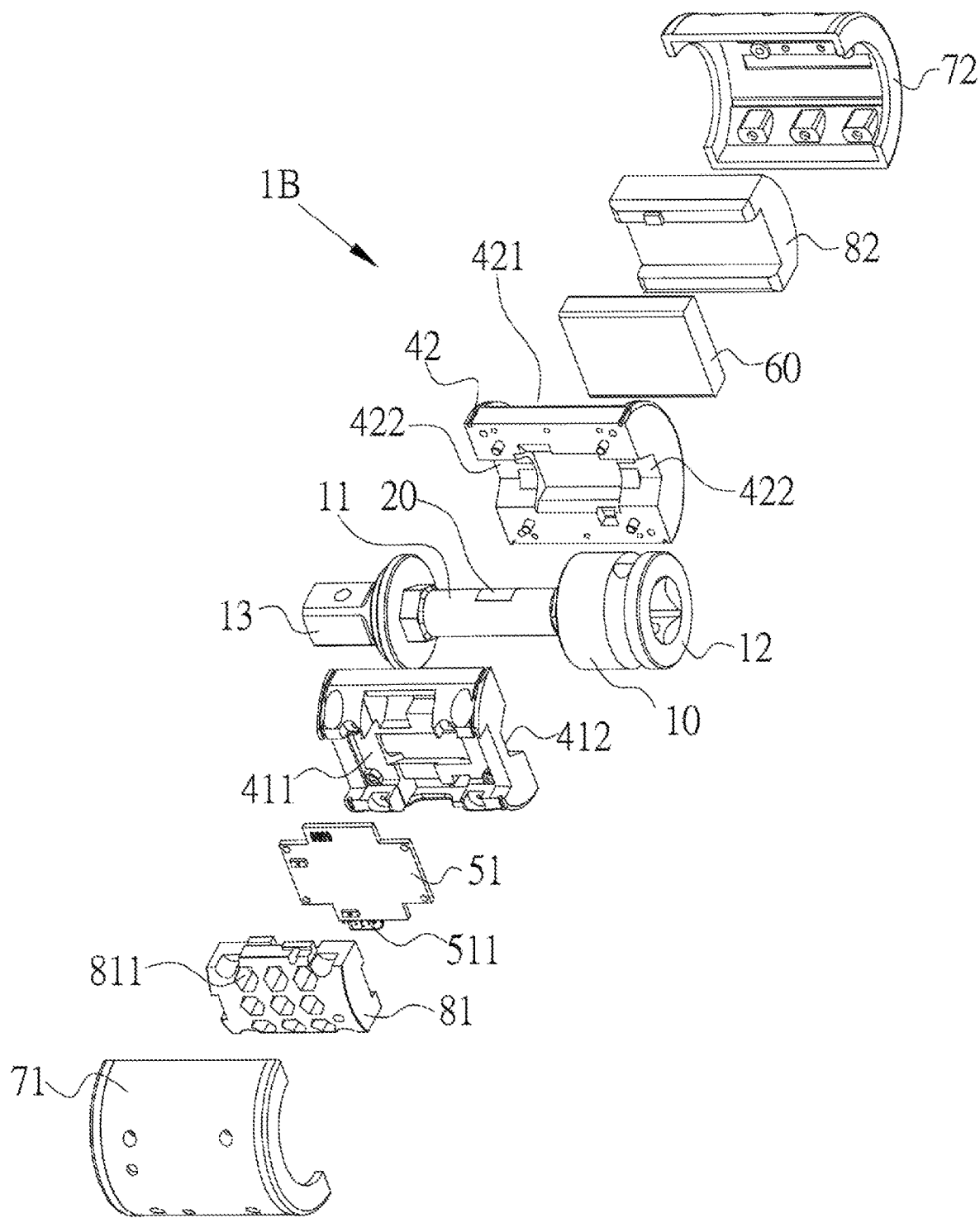
FIG. 3 depicts an explosion diagram of the torque-sensing and transmitting device according to the second embodiment of the present invention.

Please refer to FIG. 3. In the present embodiment, the torque-sensing and transmitting device of the present invention is a torque sensor. Hence, the description the same as that of the previous embodiment shall not be described repeatedly herein.

As shown, the torque-sensing and transmitting device 1B of the present invention includes a transmission body 10, a torque-sensing module 20, a first inner casing 41, a second inner casing 42, a first circuit board module 51, a battery module 60, a first circuit board module 71, a battery module 60, a first outer casing 71, a second outer casing 72, a first vibration-damping layer 81, and a second vibration-damping layer 82. A face of the first inner casing 41 is concaved to have a first capacity groove 411, and another face thereof opposite to the first capacity groove 411 has a first attaching portion 412. Two ends of the first attaching portion 412 are respectively attached to the two ends of the shaft 11. A face of the second inner casing 42 is concaved to have a second capacity groove 421, and another face thereof opposite to the second capacity groove 421 has a second attaching portion 422. Two ends of the second attaching portion 422 are respectively attached to the two ends of the shaft 11.

The first vibration-damping layer 81 and the second vibration-damping layer 82 are made of an elastic material, wherein the first vibration-damping layer 81 is covered on the outside of the first circuit board module 51, and the second vibration-damping layer 82 is covered on the outside of battery module 60. In addition, the covering method is preferably a cast molding method. Therefore, when the first circuit board module 51 is disposed in the first capacity groove 411, the first vibration-damping layer 81 is covered on the first circuit board module 51 and interposed between the first outer casing 71 and the first inner casing 41. This allows the first circuit board module 51 to make indirect contact with the first inner casing 41, thus reducing the vibration from the first inner casing 41. Similarly, when the battery module 60 is disposed in the second capacity groove 421, the second vibration-damping layer 82 is covered on the battery module 60 and interposed between the second outer casing 72 and the second inner casing 42. This allows the battery module 60 to make indirect contact with the second inner casing 42, thus reducing the vibration from the second inner casing 42.

With the aforementioned structural configuration, the first circuit board module 51 is elastically pressed and fixed between the first inner casing 41 and the first outer casing 71, and the battery module 60 is elastically pressed and fixed between the second inner casing 42 and the second outer casing 72 when assembled, thus allowing the first circuit board module 51 and the battery module 60 to make indirect contact with the first inner casing 41 and the second inner casing 42. Moreover, the problem of the first circuit board module 51 and the battery module 60 being damaged due to vibration may be effectively solved via using the first vibration-damping layer 81 and the second vibration-damping layer 82 which reduce the vibration transmitted from the transmission body 10 to the first inner casing 41 and the second inner casing 42 and then transmitted to the first circuit board module 51 and the battery module 60. In addition, the problem of the first circuit board module 51 and the battery module 60 being damaged due to vibration may also be effectively solved via using the first vibration-damping layer 81 and the second vibration-damping layer 82 as two sheet-like structures to be respectively disposed on two sides of the first circuit board module 51 and the battery module 60 facing the inner and outer casings.

It is worth mentioning that at least one face of each of the first vibration-damping layer 81 and the second vibration-damping layer 82 may be provided with a honeycomb opening portion 811, 812. With this configuration, a cooling effect may be appropriately provided when the vibration is reduced, and flexible accommodating space may also be provided when the first vibration-damping layer 81 and the second vibration-damping layer 82 are deformed due to the extrusion of the inner and outer casings when assembled.

Figure 4:
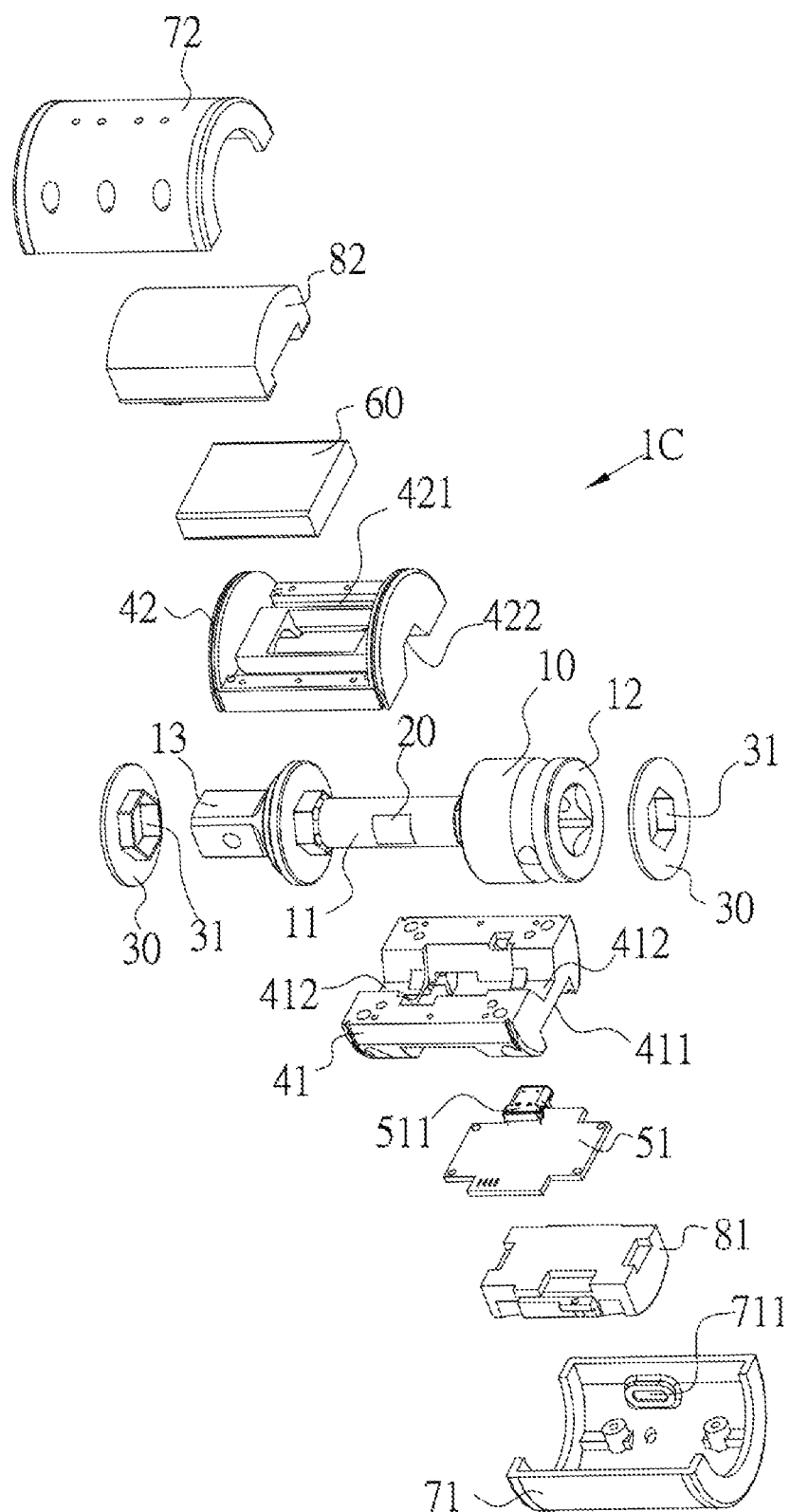
FIG. 4 depicts an explosion diagram of the torque-sensing and transmitting device according to the third embodiment of the present invention.
Figure 5:
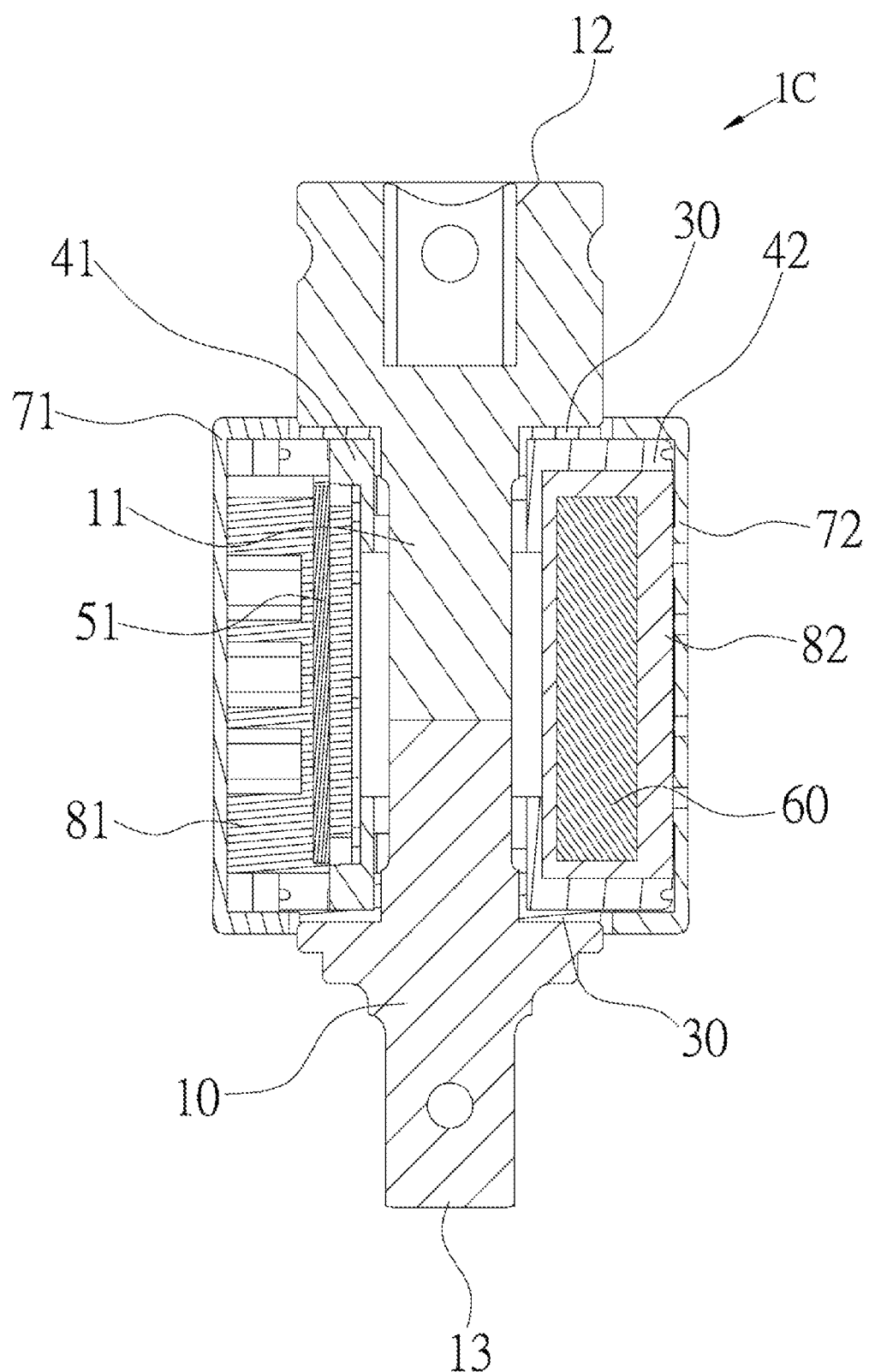
FIG. 5 depicts an assembly diagram of the torque-sensing and transmitting device according to the third embodiment of the present invention.

Please refer to FIG. 4 and FIG. 5. In the present embodiment, the torque-sensing and transmitting device of the present invention is a torque sensor.

As shown, the torque-sensing and transmitting device 1C of the present invention includes the vibration-damping member 30 in the first embodiment and the corresponding structure thereof, as well as the first vibration-damping layer 81 and the second vibration-damping layer 82 in the second embodiment and the corresponding structure thereof. Hence, the description the same as that of the previous embodiment shall not be described repeatedly herein.

It is worth mentioning that, in the aforementioned first to third embodiments, the first circuit board module 51 may include an output-input unit 511, an amplifier, a logic operator, a transmission unit, and a memory. The output-input unit 511 may be a communication bus and the like for the user to input the relation between the torque and the strain value to the memory during calibration after assembly. In addition, when the battery module 60 is a rechargeable battery, the battery may also be charged by the output-input unit 511. The amplifier 20 is configured to amplify the signal generated by the torque-sensing module 20; the logic operator is configured to calculate the signal generated by the torque-sensing module 20 and convert the signal into a corresponding torque value; the transmission module transmits the torque value to the external torque control apparatus wirelessly.

Preferably, the first outer casing 71 has an opening 711 to reveal the input-output unit 511 of the first circuit board module 51.

The main feature of the present invention is that the vibration from the shaft 11 may be largely reduced via the double damping of the vibration-damping member 30 and the first and second vibration-damping layers 81, 82, thus effectively prolonging the life span of the first circuit board module 51 and the battery module 60.

Figure 6:
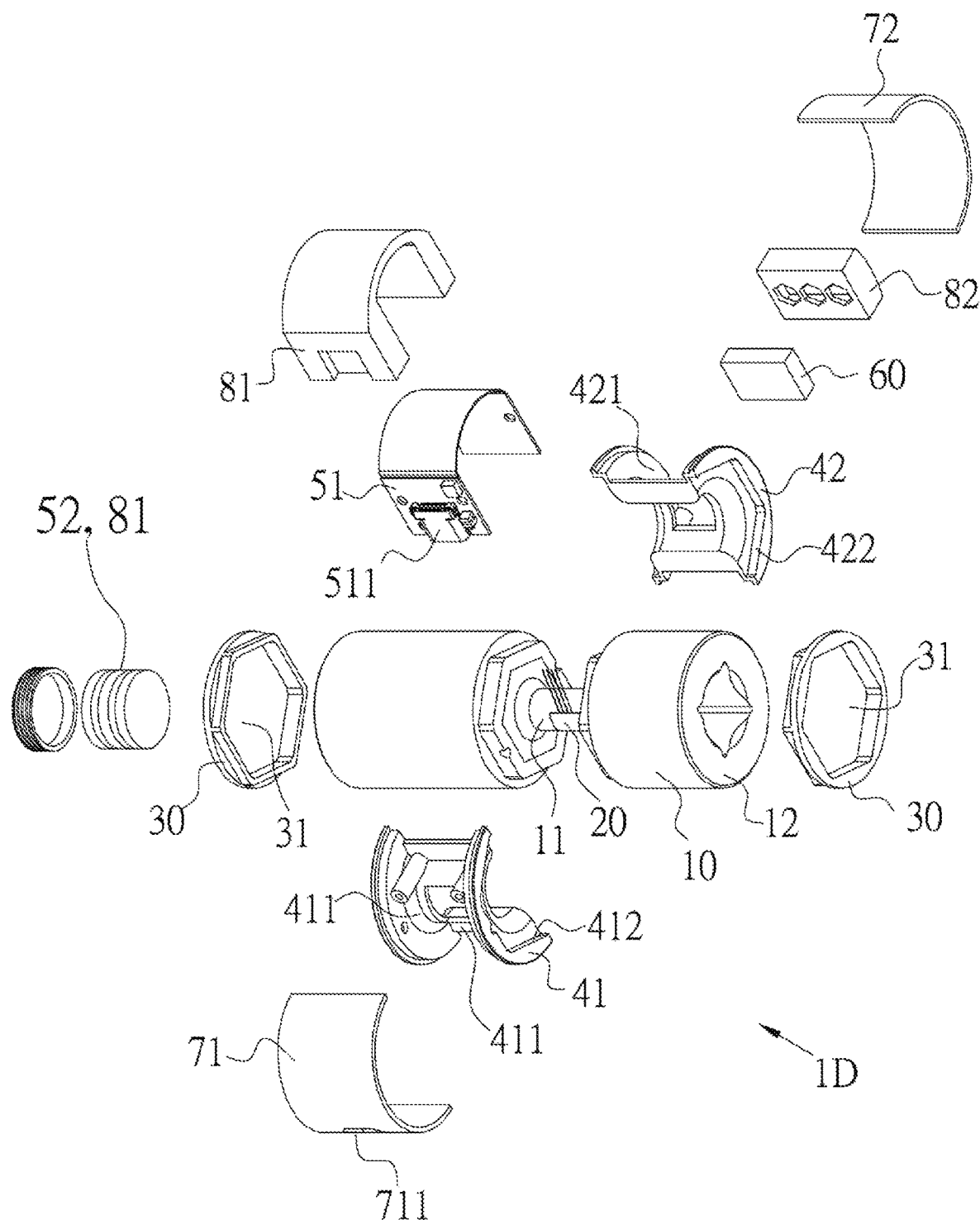
FIG. 6 depicts an explosion diagram of the torque-sensing and transmitting device according to the fourth embodiment of the present invention.
Figure 7:
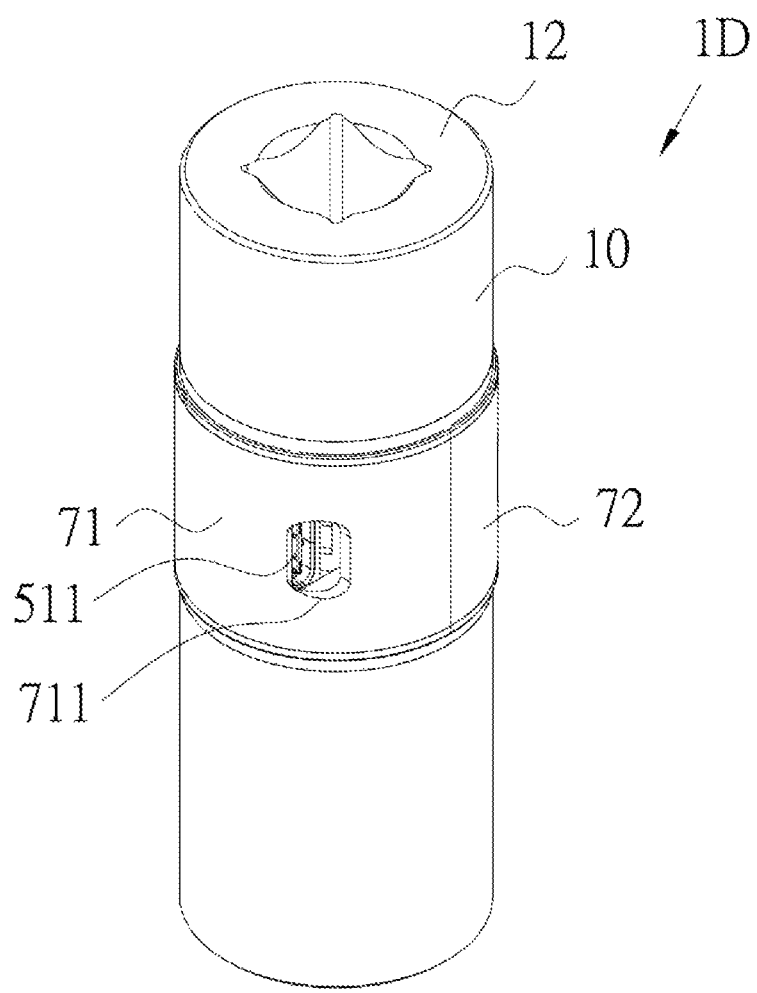
FIG. 7 depicts an assembly diagram of the torque-sensing and transmitting device according to the fourth embodiment of the present invention.

Please refer to FIG. 6 and FIG. 7. In the present embodiment, the torque-sensing and transmitting device of the present invention is a torque-sensing and transmitting sleeve and has the function of torque sensing and transmission.

As shown, the torque-sensing and transmitting device 1D of the present invention includes a transmission body 10, a torque-sensing module 20, two vibration-damping members 30, a first inner casing 41, a second inner casing 42, a first circuit board module 51, a battery module 60, a first circuit board module 71, a battery module 60, a first outer casing 71, a second outer casing 72, a first vibration-damping layer 81, and a second vibration-damping layer 82. The transmission body 10 is substantially a sleeve structure in which the middle section is concaved to form a shaft 11, and the two ends of the shaft 11 respectively have an input portion 12 and an output portion 13. Wherein, the input portion 12 is used to connect the output axis of the torque tool, and the output portion 13 is used to connect bolts or nuts to wait for the elements to be tightened.

The torque-sensing module 20 is disposed on the shaft 11. Each of the vibration-damping members 30 is disposed on the shaft 11 and respectively positioned at the two ends of the shaft 11 via the penetration portion 31 to respectively attach the input portion 12 and the output portion 13. The first inner casing 41 and the second inner casing 42 may be made of a material such as metal or plastic. Two ends of the first attaching portion 412 are respectively attached to each of the vibration-damping members 30 so that the first inner casing 41 does not have substantial contact with the transmission body 10. Two ends of the second attaching portion 422 are respectively attached to each of the vibration-damping members 30 so that the second inner casing 42 does not have substantial contact with the transmission body 10.

The first circuit board module 51 is disposed in the first capacity groove 411 and electrically connected to the torque-sensing module 20. A breach may be provided between the second capacity groove 421 and the second attaching portion 422. Further, the first inner casing 41 and second inner casing 42 may be configured as a whole, or the first inner casing 41 and second inner casing 42 may also be provided with a breach for the torque-sensing module 20 to be electrically connected to the first circuit board module 51.

The battery module 60 is disposed in the second capacity groove 421, and the battery module 60 is electrically connected to the first circuit board module 51 in order to supply required electric power to the torque-sensing and transmitting device 1D when in operation.

In the present embodiment, the first circuit board module 51 may include an output-input unit 511, a warning unit, and a switch unit. The output-input unit 511 may be a communication bus and the like for the user to input the relation between the torque and the strain value to the memory during calibration after assembly. In addition, when the battery module 60 is a rechargeable battery, the battery may also be charged by the output-input unit 511. The warning unit is configured to issue a warning message, and the switch unit is configured to turn on or off the torque-sensing and transmitting device 1D.

Wherein, the output portion 13 further includes a concave portion 131. The concave portion 131 may further include a second circuit board module 52, which may include an amplifier, a logic operator, a transmission unit, a memory, and the like. Wherein, the concave portion 131 and the space in which the middle section of the transmission body 10 is concaved to form a shaft 11 have a transmission-line guiding channel to allow the first circuit board module 51 and the second circuit board module 52 to be electrically connected. Moreover, the concave portion 131 and the space in which the middle section of the transmission body 10 is concaved to form a shaft 11 further have an antenna guiding channel to allow the antenna of the transmission unit to be able to communicate externally.

Wherein, the first vibration-damping layer 81 may be respectively covered on the first circuit board module 51 and the second circuit board module 52, and the second vibration-damping layer 82 may be covered on the outside of the battery module 60.

In a preferred embodiment, the torque-sensing and transmitting device of the present invention may be applied to a torque tool. The overall structure thereof is similar to that described above, and shall not be described repeatedly herein. Specifically, the input portion 12 may be connected to the output axis of the torque tool, and the output portion 13 may be connected to a speed change gear. In other words, the torque-sensing and transmitting device of the present invention may be connected between the output axis of the motor of the torque tool and the speed change gear as integration into the torque tool.

It should be particularly noted that the purpose of the present invention is to prevent vibration from being directly transmitted to the circuit board module and the battery module. Therefore, under appropriate application, the vibration-damping member and the vibration-damping layers may be used alternatively or in combination, which may not be limited according to the configuration samples in the embodiments.

In conclusion, with the aforementioned structural configuration, the torque-sensing and transmitting device of the present invention allows the first inner casing and the second inner casing to make indirect contact with the transmission body by using the vibration-damping member to reduce the vibration transmitted from the transmission body to the first inner casing and the second inner casing. Further, the first vibration-damping layer and the second vibration-damping layer may allow the circuit board module and the battery module to make indirect contact with the first inner casing and the second inner casing and be elastically clamped between the first and second inner casings and the first and second outer casings. This further reduces the vibration of the transmission body transmitted to the circuit board module and the battery module via the first and second inner casings, thus effectively solving the problem of the circuit board module and the battery module being damaged due to the vibration.

What is claimed is:

1. A torque-sensing and transmitting device, comprising:
a transmission body, a middle section of the transmission body concaved to form a shaft, and two ends of the shaft respectively having an input portion and an output portion;
a torque-sensing module disposed on the shaft to sense torque;
two vibration-damping members, each of the vibration-damping members made of an elastic material and being in an annular shape with an extending portion extending from a central hole thereof, and an axis thereof having a penetration portion; each of the vibration-damping members disposed at the two ends of the shaft via the penetration portion to respectively attach the input portion and the output portion;
a first inner casing, a face thereof concaved to have a first capacity groove, and another face thereof opposite to the first capacity groove having a first attaching portion; two ends of the first attaching portion respectively attached to each of the vibration-damping members and indirectly making flexible contact with the transmission body;
a second inner casing, a face thereof having a second attaching portion, and two ends of the second attaching portion respectively attached to each of the vibration-damping members and indirectly making flexible contact with the transmission body;
a first circuit board module disposed in the first capacity groove and electrically connected to the torque-sensing module; and a battery module disposed in the second inner casing and the battery module electrically connected to the first circuit board module.

2. The torque-sensing and transmitting device, according to claim 1, further comprising a first vibration-damping layer and a second vibration-damping layer, wherein the first vibration-damping layer is made of an elastic material to cover or to be cast as a molding upon an outside of the first circuit board module in such a way that the first circuit board module is flexibly pressed to the first inner casing and disposed between the first inner casing and a first outer casing when in an assembling process; the second vibration-damping layer is made of an elastic material to cover or to be cast as a molding upon an outside of the battery module in such a way that the battery module is flexibly pressed to the second inner casing and disposed between the second inner casing and a second outer casing when in an assembling process.

3. The torque-sensing and transmitting device according to claim 2, wherein another face of the second inner casing opposite to the second attaching portion is concaved to have a second capacity groove, and the battery module is disposed in the second capacity groove.

4. The torque-sensing and transmitting device according to claim 2, wherein the first vibration-damping layer and the second vibration-damping layer are provided with at least one honeycomb opening portion.

5. The torque-sensing and transmitting device according to claim 1, wherein the two ends of the shaft are in a non-circular shape, and the penetration portion, the first attaching portion, and the second attaching portion are in a non-circular shape corresponding to the two ends of the shaft.

6. The torque-sensing and transmitting device according to claim 1, wherein the torque-sensing and transmitting device is a torque sensor, the input portion is detachably connected to an output axis of a torque tool, and the output portion is detachably connected to an impact socket.

7. The torque-sensing and transmitting device according to claim 1, wherein the torque-sensing and transmitting device is a torque-sensing and transmission socket, the input portion is detachably connected to an output axis of a torque tool, and the output portion is detachably connected to an element to be tightened.

8. The torque-sensing and transmitting device according to claim 1, wherein the torque-sensing and transmitting device is disposed in a torque tool or externally connected to an output end of the torque tool.

9. A torque-sensing and transmitting device, comprising:
a transmission body, a middle section of the transmission body concaved to form a shaft, and two ends of the shaft respectively having an input portion and an output portion;
a torque-sensing module disposed on the shaft to sense torque;
a first inner casing, a face thereof concaved to have a first capacity groove, and another face thereof opposite to the first capacity groove having a first attaching portion; two ends of the first attaching portion respectively attached to the two ends of the shaft;
a second inner casing, a face thereof having a second attaching portion, and two ends of the second attaching portion respectively attached to the two ends of the shaft;
a first circuit board module disposed in the first capacity groove and electrically connected to the torque-sensing module;
a battery module disposed in the second inner casing and the battery module electrically connected to the first circuit board module;
a first vibration-damping layer made of an elastic material to cover an outside of the first circuit board module in such a way that the first circuit board module is flexibly pressed to the first inner casing and disposed between the first inner casing and a first outer casing when in an assembling process; and
a second vibration-damping layer made of an elastic material to cover an outside of the battery module in such a way that the battery module is flexibly pressed to the second inner casing and disposed between the second inner casing and a second outer casing when in an assembling process.

10. The torque-sensing and transmitting device according to claim 9, wherein the first vibration-damping layer and the second vibration-damping layer are provided with at least one honeycomb opening portion.

11. The torque-sensing and transmitting device according to claim 9, wherein the first vibration-damping layer and the second vibration-damping layer is made of an elastic material that does not block signal transmission, and are used to cover the first circuit board module and the battery module to respectively form an elastic module using a cast molding method.

12. The torque-sensing and transmitting device according to claim 9, wherein the first circuit board module comprises an input-output unit which is a universal serial bus to supply an output or input signal or input power.

13. The torque-sensing and transmitting device according to claim 12, further comprising two vibration-damping members, wherein each of the vibration-damping members is made of an elastic material and is in an annular shape with an extending portion extending from a central hole thereof, and an axis thereof has a penetration portion; each of the vibration-damping members is disposed at the two ends of the shaft via the penetration portion to respectively attach the input portion and the output portion, and is interposed between the first inner casing and the shaft as well as between the second inner casing and the shaft.

14. The torque-sensing and transmitting device according to claim 13, wherein another face of the second inner casing opposite to the second attaching portion is concaved to have a second capacity groove, and the battery module is disposed in the second capacity groove.

15. The torque-sensing and transmitting device according to claim 13, wherein the two ends of the shaft are in a non-circular shape, and the penetration portion, the first attaching portion, and the second attaching portion are in a non-circular shape corresponding to the two ends of the shaft.

16. The torque-sensing and transmitting device according to claim 13, wherein the torque-sensing and transmitting device is a torque sensor, the input portion is detachably connected to an output axis of a torque tool, and the output portion is detachably connected to an impact socket.

17. The torque-sensing and transmitting device according to claim 13, wherein the torque-sensing and transmitting device is a torque-sensing and transmission socket, the input portion is detachably connected to an output axis of a torque tool, and the output portion is detachably connected to an element to be tightened.

18. The torque-sensing and transmitting device according to claim 13, wherein the torque-sensing and transmitting device is disposed in a torque tool or externally connected to an output end of the torque tool.

* * * * *